United States Patent [19]

Nelson et al.

[11] Patent Number: 4,854,120
[45] Date of Patent: Aug. 8, 1989

[54] PERFORMANCE ENVELOPE EXTENSION METHOD FOR A GAS TURBINE ENGINE

[75] Inventors: Neil M. Nelson, Winterhaven; William A. Sponzilli, Sarasota; Quitman W. Lott, Lakeland, all of Fla.

[73] Assignee: CEF Industries, Inc., Haines City, Fla.

[21] Appl. No.: 132,181

[22] Filed: Dec. 14, 1987

Related U.S. Application Data

[62] Division of Ser. No. 911,870, Sep. 28, 1986, Pat. No. 4,723,529.

[51] Int. Cl.$^4$ ............................ F02C 7/00; F01D 25/36
[52] U.S. Cl. .................................. 60/39.02; 60/39.091
[58] Field of Search ............... 60/39.02, 39.091, 39.13, 60/39.142, 39.33, 706, 708; 415/122 R, 123

[56] References Cited

U.S. PATENT DOCUMENTS

| | | | |
|---|---|---|---|
| 2,129,529 | 9/1938 | Howard | 415/20 |
| 3,617,253 | 11/1952 | Fusner et al. | 60/39.091 |
| 3,919,894 | 11/1975 | Keeter et al. | 60/39.142 |
| 4,069,424 | 11/1978 | Burkett | 290/52 |
| 4,211,070 | 7/1980 | Portmann | 60/39.091 |
| 4,507,926 | 4/1985 | Teckentrup et al. | 60/39.142 |
| 4,643,637 | 2/1987 | Strickler | 415/122 R |

*Primary Examiner*—Louis J. Casaregola
*Attorney, Agent, or Firm*—Burns, Doane, Swecker and Mathis

[57] ABSTRACT

The present invention relates to a device for extending the performance life of a gas turbine engine by rotating the turbine after shutdown to achieve uniform cooling. The apparatus includes a motor, a high ratio gearset engaged with the motor, an overridable coupling means engaging the gearset with an accessory shaft of the turbine, and a logic circuit. The circuit determines when the engine has been shut down and continues to rotate the turbine for a predetermined period of time. If an external force interferes with the post-shutdown turning, the circuit will sense that force and compensate for it.

13 Claims, 2 Drawing Sheets

PERFORMANCE ENVELOPE EXTENSION METHOD FOR A GAS TURBINE ENGINE

This application is a divisional of application Ser. No. 911,870 filed Sept. 26, 1986 now U.S. Pat. No. 4,733,529.

BACKGROUND OF THE INVENTION

This invention pertains to a device whose principal function is to maintain the performance margin of gas turbine engines at higher levels over considerably longer periods of time, compared to identical models of power plants which do not have the apparatus installed. The device is particularly adapted for use on aircraft gas turbine engines, although it may have other applications on industrial and marine derivatives.

The performance of a gas turbine engine is related to the maintenance of a close fit between the rotating and stationary seals located in the compressor and turbine sections of the engine. The efficiency of the engine in part depends upon the amount of work output that can be extracted from the hot high pressure gas passing through the turbine section of the engine.

Inevitably some gas will avoid the turbine blades by passing through a small gap between the rotating and stationary seals in the turbine section. Engine efficiency can be maintained by minimizing the amount of gas that does bypass the turbine blades. This minimization is accomplished by maintaining the tolerance of the seals as closely as possible.

Efficiency can similarly be maintained by keeping the seals in the compressor sections of the engine at minimal tolerances.

Close tolerances in all of these seals result in higher power output and improved fuel combustion efficiency. In aircraft flight operational terms, the prolonged efficiency resulting from close tolerances assures shorter take off distances, improved time to climb, and greater range and maneuverability. For a large modern four engine commercial airliner, a one percent improvement in fuel consumption saves an average of approximately 100,000 gallons of fuel per year.

That absolute minimal clearances between the rotating and stationary seals are of critical importance to obtain maximum performance with the least fuel burn is borne out by the newer designs of aircraft gas turbine engines which are now fitted with a device which in some cases is called "active tip clearance control". This control system operates by circulating cooled air through passageways and ducts around the turbine case after the aircraft has reached its cruise mode. The cooling contracts the case so as to reduce its diameter and provides a much closer clearance between the turbine blade tips and the stationary seals. Throttle advancement shuts off the cooling air and allows the turbine case to expand as a result of thermal expansion in order to minimize any seal rub resulting from rapid thermal expansion of the rotating elements.

At rated power, large aircraft gas turbine engines normally operate in the temperature range of approximately 600° F. at the compressor discharge point and approximately 2300° F. at the turbine inlet area, with the temperature decreasing toward the turbine outlet.

Once the engine is shut down, the various components of the engine cool down at different rates because of their respective geometries, mass, and locations within the engine. Because hot air rises, the lower sections of the engine cool, and thus contract in length, at a rate greater than that of the components on the upper section of the engine. These differences in cooling rates result in the engine taking an undesirable deformation after the cool down time is completed. This deformation is known in the trade as "engine bow" or "going banana shape". It occurs in all aircraft gas turbine engines to a greater or lesser degree, depending on their design and operating parameters. The "bowing" is most pronounced in the casing and stationary seals of the engine. There may, however, be some bowing in the turbine shaft itself, perhaps to a lesser degree.

This "bowing" is not so pronounced as to be visible by the naked eye. Rather, the contraction and bowing is measured in fractions of an inch applicable to both rotating and stationary components. Evidence of "engine bow" has been established by various tests conducted by original engine manufacturers, wherein concrete evidence of seal rub in various clock locations has been seen on new engines after several initial run-in cycles which could only be attributable to lack of concentricity between rotating and stationary components caused by uneven cooling and resultant "engine bow".

Once the engine has developed a "bow", the compressor and turbine rotors will no longer be aligned perfectly concentrically with their corresponding stationary seals. As a result, if the engine is motored over during the starting transient, the rotors will rub and deteriorate the stationary seals in certain clock locations causing an unwanted increase in seal clearance, and hence, a performance loss.

A secondary problem resulting from the "bowing" phenomenon is that during the starting transient, there is also a measurable vibration because of the bowed condition. This mode gradually disappears as the engine warms up. However, it is recognized by aircraft turbine engine designers that any form of vibration excitation is an unwanted characteristic and should be eliminated or held to an absolute minimum. In addition to passenger discomfort, vibrating patterns can influence bearing life along with other parts affected by vibration excitation.

Another problem resulting from "engine bow" or lack of concentricity between the stationary and rotating components in certain types of high pressure ratio aircraft gas turbine engines is the phenomena known as "start-stall". In this case, the turbomachinery experiences an aerodynamic stall mode during the starting transient due mainly to the unwanted swirl effect or eddying of air through the compressor caused by nonuniform radial clearances between the stationary and rotating components which initially were the result of "engine bow" with attendant seal rub.

Large stationary turbines used primarily for electric power generation also have certain problems that can be minimized by rotating them after shutdown. Certain attempts have been made to minimize the problems associated with large stationary power generation turbines. For example:

U.S. Pat. No. 2,617,253 relates to a safety control system for cooling a stationary gas turbine power plant after shutdown. This system rotates the turbine to cool it in order to prevent hot gasses from the heat exchangers from blowing back into the compressor which is not designed to withstand high temperatures. This system employs the starter motor for the post-shutdown turning and includes a pressure sensitive switch adjacent the compressor and a thermostatic switch near the heat exchangers to start and stop the post-shutdown turning.

U.S. Pat. No. 2,129,529 is directed to an elastic fluid turbine turning mechanism that senses shutdown of a large stationary turbine and engages a motor to turn the turbine slowly in order to prevent sagging of the rotor shaft. The mechanism will continue to rotate the turbine indefinitely because the large weight of the turbine will cause sagging of the shaft if it is held in a stationary position.

U.S. Pat. No. 2,252,456 similarly discloses a system for turning a stationary turbine after shutdown for an indefinite period of time. This system uses an overridable clutch, so that if the turbine is started while being manually turned, the clutch engaging the turbine to the turning motor will slip.

The above-described patented systems are designed for large stationary turbines, and are not suitable for use on gas turbine engines.

As set forth above, the phenomenon of "bowing" and the problems associated therewith have been recognized by experts in the aircraft gas turbine industry. It has also been recognized that turning the turbine after shutdown allows the engine to cool more uniformly, thus avoiding the problems discussed above. In fact, testing has been done by manually engaging an auxiliary motor to the engine auxiliary shaft for the purpose of post-shutdown turning. However, no attempt has previously been made to develop a convenient self-contained operator independent system for automatically turning a gas turbine after shutdown.

A post-shutdown turning device for an aircraft turbine engine has unique sensing, size, weight and power requirements that are not relevant to the larger, stationary power generating turbines. In addition, the environment in which the aircraft turbine engines are used periodically subjects them to loading wind gusts that would interfere with post-shutdown turning by a light weight motor. Also, the rugged environment requires a device that can operate under extreme temperatures, vibration, and shock. The reliability of the device must also exceed the time between overhaul period for its benefit to be fully realized.

OBJECTS AND SUMMARY OF THE INVENTION

In view of the foregoing limitations and shortcomings of the prior art devices, as well as other disadvantages not specifically mentioned above, it should be apparent that prior to the present invention there existed a need in the art for a small, light-weight device that could monitor an aircraft turbine engine and slowly rotate it for a predetermined period after shutdown, with the further requirements that such device operate in the difficult environments in which an aircraft turbine engine is operated. It is therefore, a primary object of this invention to fulfill that need by providing such a device.

More particularly, it is an object of this invention to reduce or eliminate post-shutdown "bowing" of a turbine engine.

It is another object of this invention to provide a control device for post-shutdown turning of an aircraft turbine engine that is able to sense torques applied to the turbine in either direction and compensate for those torques.

Another object of the present invention is to provide a control device for post-shutdown turning of an aircraft turbine engine that is able to allow environmental forces, such as wind, to assist with the turning.

It is still another object of the present invention to provide a control device for post-shutdown turning of an aircraft turbine engine that will allow the turbine to rotate in either direction.

It is still another object of the present invention to present minimal frictional drag to the turbine engine while the turbine engine is operating.

It is still another object of the present invention to permit manual operation of the device for maintenance and inspection purposes.

It is yet another object of the present invention to provide a control device for post-shutdown turning of an aircraft turbine engine that includes a testing and logic circuit that can monitor the turbine on a constant basis with minimal power consumption requirements.

Still another object of the present invention is to provide a device for post-shutdown turning of a turbine engine that will sense a restarting of the engine and then automatically disengage itself.

It is a still further object of the present invention to provide a device for post-shutdown turning of an aircraft turbine engine that will disengage itself if an auxiliary force turns the turbine, yet will continue to count down from the engine shutdown and will re-engage itself if the auxiliary force is removed prior to the termination of a predetermined period of time.

It is an additional object of the present invention to provide a device for post-shutdown turning of an aircraft turbine engine that is durable enough to last between engine overhauls.

Briefly described, these and other objects are accomplished according to the invention as follows:

A light-weight compact device including a brushless DC motor, a gearset, a coupler/decoupler clutch, shaft speed sensors, and a logic circuit is detachably mounted to an aircraft turbine engine accessory pad. The sensors and logic circuit determine when the rotation of the aircraft turbine drops to a "turning" threshold "A" after operation above an "operating" threshold "B". At that point, the circuit initiates a timer/counter to count to "T", the time period necessary for adequate post-shutdown cooling, and turns on the DC motor. Absent intervening forces, the motor will rotate the turbine for the predetermined time period "T" and will then be turned off.

If the sensor determines that the turbine speed is sufficient to indicate that the engine has been restarted, the DC motor will be turned off. If an opposing force reduces the turbine speed to zero, it will turn the motor off and let the turbine be turned by the opposing force. The sensor will restart the DC motor if the opposing force is removed before the period T has lapsed.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE PREFERRED EMBODIMENT

Figure 1:
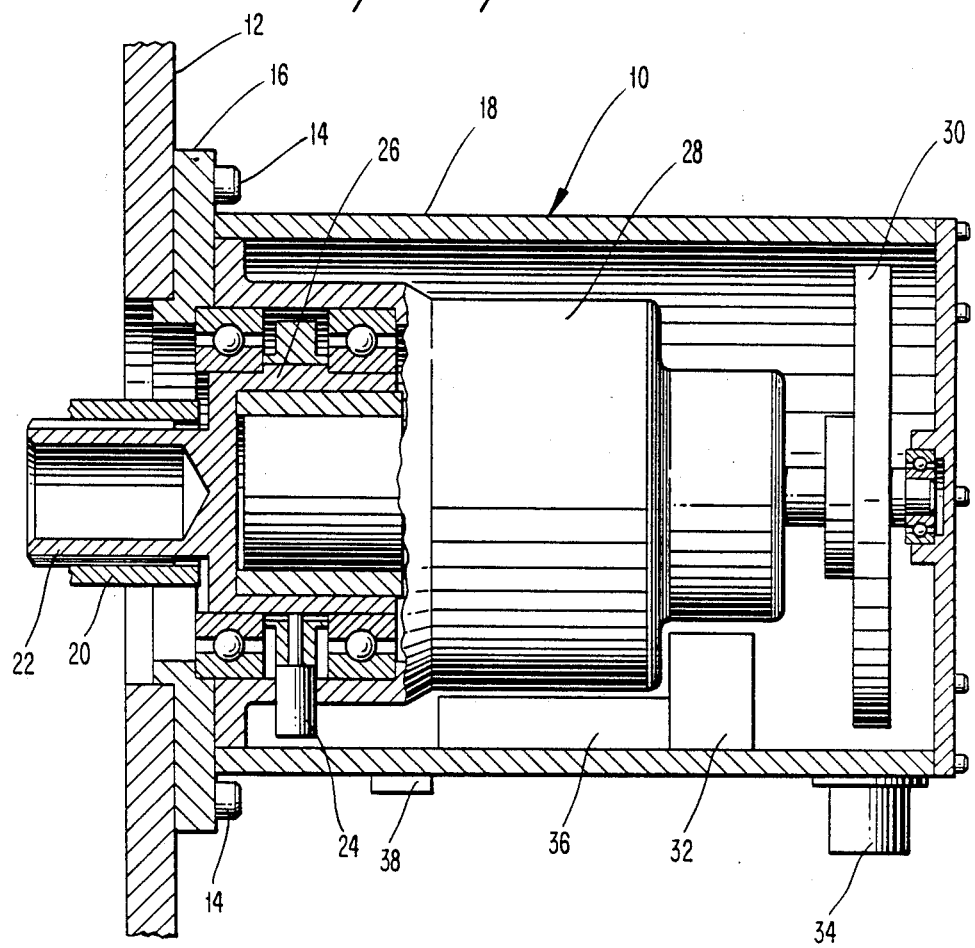
FIG. 1 is a side view, in partial cross section, of a device according to the present invention.

Referring now in detail to the drawings, there is illustrated in FIG. 1 a device, designated generally by reference numeral 10, for turning a turbine engine spool (i.e., the turbine, compressor and shaft) (not shown) after shutdown for a predetermined period of time.

The device 10 may be bolted, or otherwise suitably attached, to a standard engine accessory pad 12 of a conventional aircraft turbine engine (not shown) by bolts or studs 14 extending through flanges 16 on the device casing 18. At the right side of FIG. 1 is shown the end portion of an engine accessory shaft 20. A splined shaft 22, projecting out from within the device 10, engages with the engine accessory shaft 20. Speed sensors 24, preferably of the Hall Effect type, are mounted adjacent the splined shaft 22 so as to be able to monitor the speed thereof. The sensors 24 generate pulses in proportion to the number of revolutions of the shaft.

The end of the splined shaft 22 opposite the engine accessory shaft 20 is fixed to an electromagnetic, mechanical or fluid coupler/decoupler system 26. Preferably the system 26 is of the mechanical type that will positively engage in one direction, but will allow an override or slip if the turbine shaft is turned by another source in the same direction at a faster speed, without mechanical drag to the operating engine. An example of such a coupler/decoupler system 26 is the Torrington drawn cup roller clutch which transmits torque between a shaft and a housing in one direction and allows free overrun in the opposite direction.

Connected to the splined shaft 22, via the coupler system 26 is a gearset 28, preferably of the planetary type. The gearset 28 is designed with a ratio such that the splined shaft 22 will be turned at a significantly slower speed than the input speed to the gearset 28. The gearset 28 is also designed with back driving capability, such that a torque applied to the splined shaft 22 could be transmitted through the gearset 28. Thus, a loading wind gust could possibly turn the turbine in a direction opposite to that in which it normally turns. Such turning would be able to back drive a motor through the gearset 28 without deleterious effect.

A brushless DC motor 30 is directly engaged to the input side of the gearset 28. The motor preferably operates on 28 volts DC or battery DC power and is rated at under one horsepower. Because of the high ratio gearset 28, a large motor is not necessary. The motor is also of the type that can withstand a continuous stall torque without adversely affecting motor life.

Figure 2:
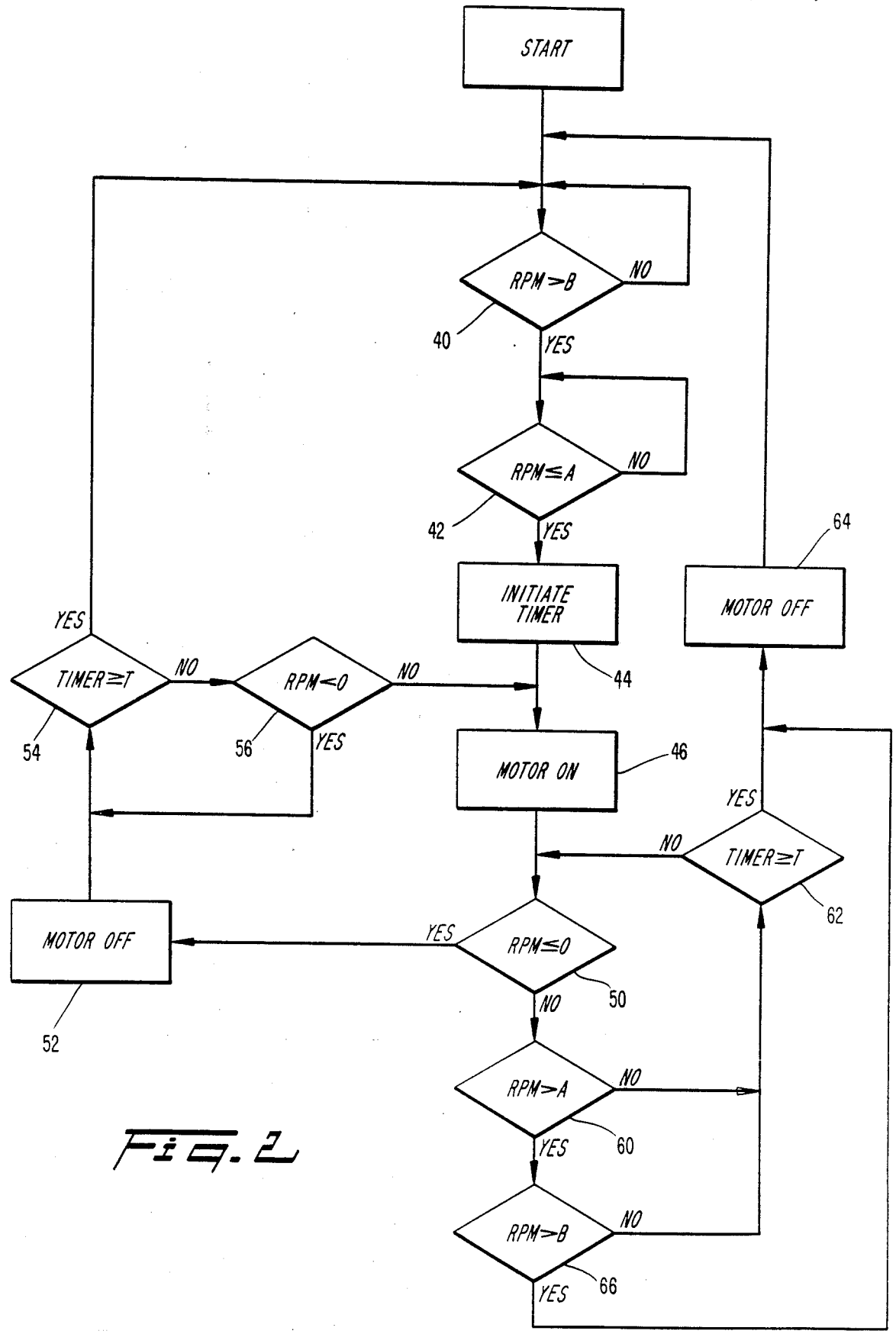
FIG. 2 is a flow chart representing the logic circuit of the device according to the present invention.

A logic circuit 32 controls the operation of the motor 30 in accordance with the flow chart illustrated in FIG. 2. The logic circuit 32 receives a rotational input signal from sensors 24 and power from a connector 34 which may be connected to a continuously available power source located elsewhere in the aircraft. A voltage regulator 36 steps down and regulates the power received from connector 34 to a level acceptable for the logic circuit 32. The logic circuit 32 may be a hard wired device or a programmed microprocessor, which may be tailored to specific engine requirements. The selection of such a device would be readily apparent to one skilled in the art of logic circuits.

A manual switch 38 may be provided for overriding the logic circuit 32 and manually controlling the motor 30.

OPERATION OF THE PRESENT INVENTION

During normal operation of the engine, the engine accessory shaft 20 will rotate the splined shaft 22 which will rotate the coupler system 26. Because of the override feature of the coupler system 26, when the turbine is turning in the direction of normal engine operation, the coupler system 26 will spin without engagement. Thus, the gearset 28 and motor 30 will neither be affected by normal engine operation, nor will they present any frictional drag to the operating engine.

The logic circuit 32, which normally is in a monitoring mode, compares the turbine speed signal from sensors 24 to a predetermined speed "B", which is approximately the engine idling speed. Once the turbine speed, as indicated by the signal from sensors 24, exceeds speed "B" (see comparative step 40, FIG. 2), the circuit 32 then compares the speed signal to a predetermined speed "A", which is equal to a predetermined speed suitable for post-shutdown rotation (comparative step 42). Speed "A" is approximately two to five revolutions per minute. The detection by the circuit 32 of a drop in speed from "B" to "A" signals the device that the engine has been shutdown. It should be noted that speeds "A" and "B" are not critical, but may be set at any reasonable value within the context of the present invention.

When the circuit 32 determines that the turbine speed has dropped to "A", a timer/counter within the circuit is initiated to start counting real time (step 44). After initiating the timer, the motor 30 is then activated (step 46).

At this point, the motor 30 is rotating the turbine and the logic circuit 32 is counting the time from the approximate moment that the motor was turned "on".

The logic circuit 32 monitors the turbine speed at this stage to detect if a contrary force, such as loading wind gusts, prevents turbine rotation (comparative step 50). If such a force reduces the turbine speed to less than or equal to zero, the circuit 32 turns the motor 30 "off" (comparative step 52), and checks the remaining time (comparative step 54). If the accumulated time is greater than or equal to a predetermined time "T", then the circuit 32 proceeds to the beginning of the flow chart (step 40) to await restarting of the turbine. "T" is set to the time determined necessary for adequate cooling, for the particular engine model. The motor 30 is designed to take rotation in both directions, and, once the motor is turned off, will then rotate in the reverse direction as a result of the contrary force.

If the accumulated time is not yet equal to "T", the circuit 32 again tests for the turbine speed (comparative step 56). If the speed is less than zero, i.e., the contrary force is turning the turbine in the reverse direction, the circuit 32 rechecks the accumulated time (comparative step 54). If the turbine speed is greater than or equal to zero, i.e., the contrary force is no longer present, then the circuit 32 reengages the motor (step 46).

If at comparative step 50 in the FIG. 2 flow chart, the turbine speed was greater than zero and less than or equal to "A" (step 60), the circuit 32 tests to see if the accumulated time is greater than or equal to "T" (comparative step 62). If so, the circuit 32 turns the motor "off" (step 64) and returns to the beginning of the flow chart (step 40). If the accumulated time has not reached "T", the circuit proceeds to step 50.

If outside forces, such as wind gusts, complement the motor 30 in turning the turbine, the turbine may spin at a speed greater than that which the motor 30 is turning. In that case, the coupler system 26 will slip allowing the turbine to rotate freely (step 60).

If the turbine speed exceeds "A", the circuit 32 will then test to see if the engine has been turned on by determining if the turbine speed exceeds "B" (comparative step 66). If so, the circuit 32 will then turn the motor 30 "off" and proceed to the beginning of the flow chart. If the speed is less than "B", i.e., the turbine has not been started, the circuit 32 will test to see if the accumulated time is greater than or equal to "T" (comparative step 62). If so, the circuit 32 will turn the motor 30 off (step 64) and proceed to the beginning of the flow chart. If the accumulated time is less than "T", the circuit 32 proceeds to step 50.

Because the initial temperature from which the engine must be cooled is significantly higher than generally ambient temperatures, the period "T" can remain constant regardless of whether the aircraft is in arctic or tropical conditions. However, the logic circuit 32 can be adjusted for local conditions should the end user so desire. If desired, a temperature sensor can be used to automatically set "T" to a preferred period in response to the ambient temperature.

In the event of an in-flight shut-down, normally prevailing conditions would cause the turbine to "windmill" at a speed between "A" and "B". Therefore, the motor 30 would not be started.

The logic circuit can be further programmed to detect sudden stoppage such as that due to catastrophic engine failure or battle damage. In such a case, the motor 30 would not be activated.

The logic circuit 32 is preferably of the type where programmed features are not lost due to power failure or deliberate disconnect from the power source. Although the circuit 32 is designed to remain on indefinitely, additional monitoring features can be added to indicate in the cockpit or to ground personnel whether the device 10 is "on" or "off", and whether or not the motor 30 is "on".

The method of mounting of the device 10 may vary slightly with different engines, although the basic concept of the present invention is to provide a light weight accessory that can be easily adapted to many different types of engines. The device is further designed to be easily retrofit on an engine previously mounted on an aircraft.

Although only a preferred embodiment is specifically illustrated and described herein, it will be appreciated that many modifications and variations of the present invention are possible in light of the above teachings and within the purview of the appended claims without departing from the spirit and intended scope of the invention.

What we claim is:

1. A method of uniformly cooling a gas turbine engine having a spool, comprising the steps of:
   determining when the engine is shutdown;
   turning on an auxiliary motor to rotate the spool after the engine is shutdown;
   determining if an external force in preventing the auxiliary motor form rotating the spool;
   turning off the auxiliary motor if such an external force is detected and allowing the external force to rotate the spool;
   determining when a predetermining time period after turbine shutdown has elapsed; and turning the auxiliary motor off after the time period has elapsed if the auxiliary motor is on at that time.

2. The method according to claim 1, wherein if the auxiliary motor is turned off to allow an external force to rotate the spool; then:
   determining if the external force ceases to rotate the spool prior to the elapsing of the time period; and
   restarting the auxiliary motor to rotate the spool if the external force ceases to rotate the spool prior to the elapsing of the time period.

3. The method according to claim 2, further comprising the steps of:
   determining whether the engine is restarted during the time period; and
   if the engine is restarted, then turning the auxiliary motor off.

4. A method of uniformly cooling a gas turbine engine having a spool, comprising the steps of:
   determining when the engine is shutdown;
   rotating the spool after the engine is shutdown by means of an auxiliary motor;
   determining when a predetermined time period after turbine shutdown has elapsed;
   ceasing rotation of the spool after the predetermined time period has elapsed;
   monitoring the engine to determine of an external force is preventing the auxiliary motor from rotating the spool during the predetermined time period; and
   turning off the auxiliary motor if such an external force is detected and allowing the external force to rotate the spool.

5. The method of claim 4, further comprising the steps of:
   monitoring the engine to determine if the engine is restarted during the predetermined time period;
   turning the auxiliary motor off if it is determined that the engine has been restarted during the predetermined time period.

6. The method of claim 4, wherein the spool is rotated by the auxiliary motor at a speed less than five revolutions per minute.

7. The method of claim 4 wherein if the auxiliary motor is turned off to allow an external force to rotate the spool, then:
   monitoring the engine to determine if the external force ceases to rotate the spool prior to the elapsing of the predetermined time period; and
   restarting the auxiliary motor for purposes of rotating the spool if the external force ceases to rotate the spool prior to the elapsing of the predetermined time period.

8. A method of uniformly cooling a gas turbine engine, comprising the steps of:
   monitoring the speed of the engine to determine if the engine speed has exceeded a first predetermined speed and then subsequently slowed below a second predetermined speed;
   activating an auxiliary motor to continue rotating the engine when the engine speed has slowed below the second predetermined speed after previously exceeding the first predetermined speed; and
   deactivating the auxiliary motor after a predetermined period of time after the activation of the auxiliary motor.

9. The method of claim 8, further comprising the step of deactivating the auxiliary motor if the engine speed exceeds the first predetermined speed during the predetermined period of time.

10. The method of claim 8, further comprising the step of deactivating the motor if the motor is activated and the engine speed becomes zero of less than zero.

11. The method of claim 8, wherein the auxiliary motor rotates the engine at a speed less than five revolutions per minute.

12. The method of claim 8, wherein the first predetermined speed is the engine idling speed.

13. The method of claim 8, wherein the second predetermined speed is within the range of two to five revolutions per minute.

* * * * *

UNITED STATES PATENT AND TRADEMARK OFFICE
CERTIFICATE OF CORRECTION

PATENT NO. : 4,854,120

DATED : August 8, 1989

INVENTOR(S) : Neil M. NELSON et al

It is certified that error appears in the above-identified patent and that said Letters Patent is hereby corrected as shown below:

Please amend the claims as follows:

CLAIM 1:

line 6, change "in" to -- is --;

line 7, change "form" to -- from --;

line 11, change "predetermining" to -- predetermined --.

CLAIM 4:

line 10, change "of" to -- if --.

Please amend the cover page of the patent as follows:

UNITED STATES PATENT AND TRADEMARK OFFICE
CERTIFICATE OF CORRECTION

PATENT NO. : 4,854,120

DATED : August 8, 1989

INVENTOR(S) : Neil M. Nelson et al

It is certified that error appears in the above-identified patent and that said Letters Patent is hereby corrected as shown below:

UNDER "RELATED U.S. APPLICATION DATA":

change "4,723,529" to --4,733,529--.

Signed and Sealed this

Third Day of July, 1990

*Attest:*

HARRY F. MANBECK, JR.

*Attesting Officer*      *Commissioner of Patents and Trademarks*